April 25, 1967     K. ZUBER     3,316,035
NEEDLE BEARING AND RETAINER ASSEMBLY FOR GEARS
Filed June 9, 1965

INVENTOR:
KAROL ZUBER
ATTORNEYS.

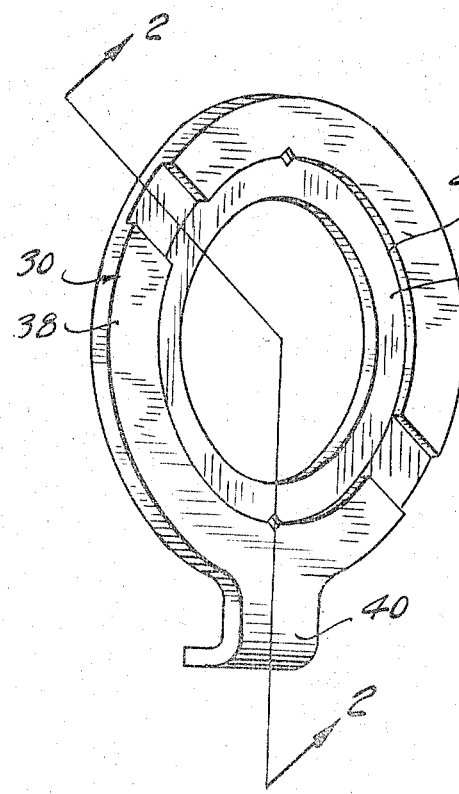
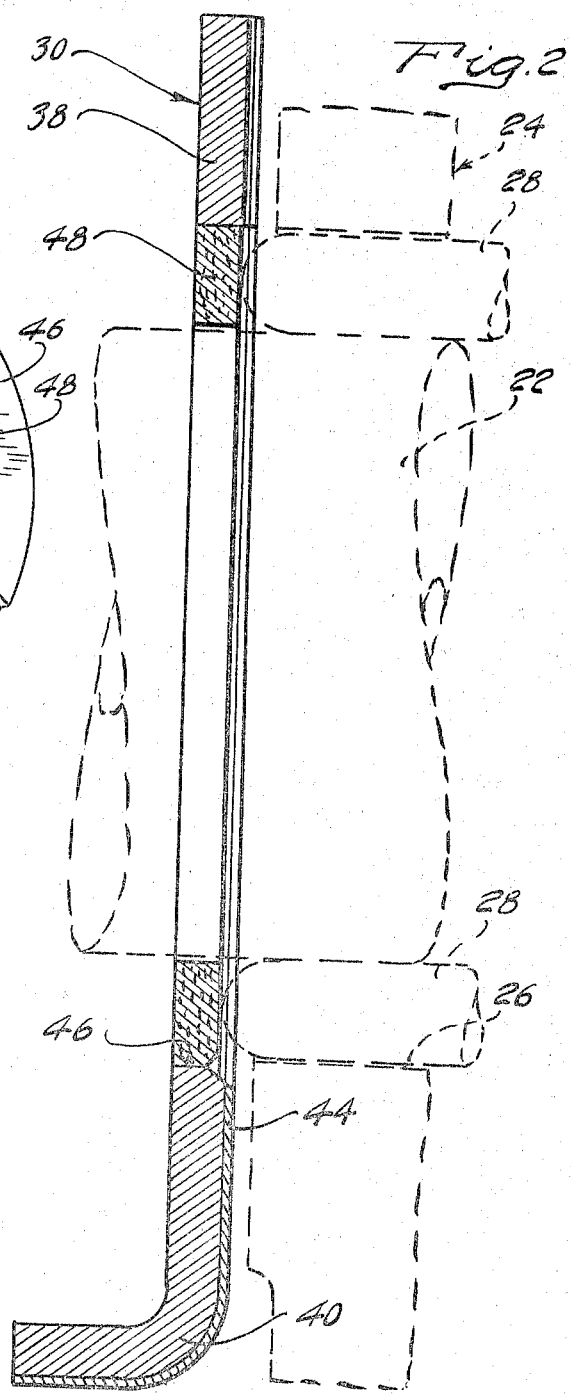

United States Patent Office 3,316,035
Patented Apr. 25, 1967

3,316,035
NEEDLE BEARING AND RETAINER ASSEMBLY FOR GEARS
Karol Zuber, Southfield, Mich., assignor to Ford Motor Company, Dearborn, Mich., a corporation of Delaware
Filed June 9, 1965, Ser. No. 462,596
4 Claims. (Cl. 308—35)

My invention relates generally to torque transmitting gearing and more particularly to a pinion arrangement that includes a pinion shaft and an improved needle bearing assembly for journaling a pinion upon the shaft.

It is current design practice in the development of geared power transmission mechanisms to provide pinion bearings in the form of needle rollers supported by stationary pinion shafts. Pinion bearings of this type provide maximum radial loading capacity for any given bearing size. They are relatively economical to manufacture. The needle rollers, which are situated within a bore formed in the pinion, are disposed in close proximity to each other and in parallel disposition with respect to the axis of the shaft.

It is common practice to employ a cage or needle retainer for keeping the needles in assembled relationship. Usually the pinion bore serves as an outer race for the needle roller bearing assembly and the pinion shaft serves as the inner race. Thrust washers are disposed about the shaft on either side of the pinion. These are adapted to transfer thrust forces from the pinion to the pinion shaft mounting structure, which may be a planetary carrier in a planetary gear system.

During operation the carrier rotates, thereby creating centrifugal forces on the retainer due to the weight of the retainer and due to the weight of the needle bearing rollers that are connected to it. This produces binding between the retainer and the pinion bore and causes the needle rollers to malfunction.

It is an object of my invention to provide a needle roller bearing assembly in an environment of this type but which will avoid the foregoing disadvantage.

In prior art arrangements of the type above described the retainer is inserted within the bore in the pinion and occupies a portion of the annular space surrounding the pinion shaft. The needle rollers thus must be shorter than the axial width of the pinion. This necessity to reduce the length of the rollers reduces accordingly the capacity of the bearing and the fatigue life of the bearing. It is another object of my invention, therefore, to provide a bearing assembly for pinions in an environment of the type described in the foregoing paragraphs, but which includes rollers that are of a length at least as great as the width of the pinion with which they are used.

It is a further object of my invention to provide a pinion bearing assembly which is characterized by an increased operating life due to reduced wear for any given load.

It is another object of my invention to provide a bearing assembly for mounting pinions on planetary carrier pinion shafts which is characterized by an open lubrication oil passage through the needles of the bearing assembly.

It is a further object of my invention to provide a pinion bearing arrangement of the type above set forth and which includes, as part of the bearing assembly, thrust washers on either side of the pinion.

It is a further object of my invention to provide a needle roller bearing assembly for use in torque transmitting gearing which is characterized by reduced centrifugal forces due to rotation of the associated mounting shaft and by a lack of stress concentration points which would result in early failure of the needle rollers.

Further objects and features of my invention will become apparent from the following description and from the accompanying drawings wherein:

FIGURE 2 is an enlarged cross-sectional view of a pinion thrust washer and a needle roller retainer ring which forms a part of the assembly of FIGURE 1; and FIGURE 3 is a front elevation view of the structure of FIGURE 2.

Figure 1:
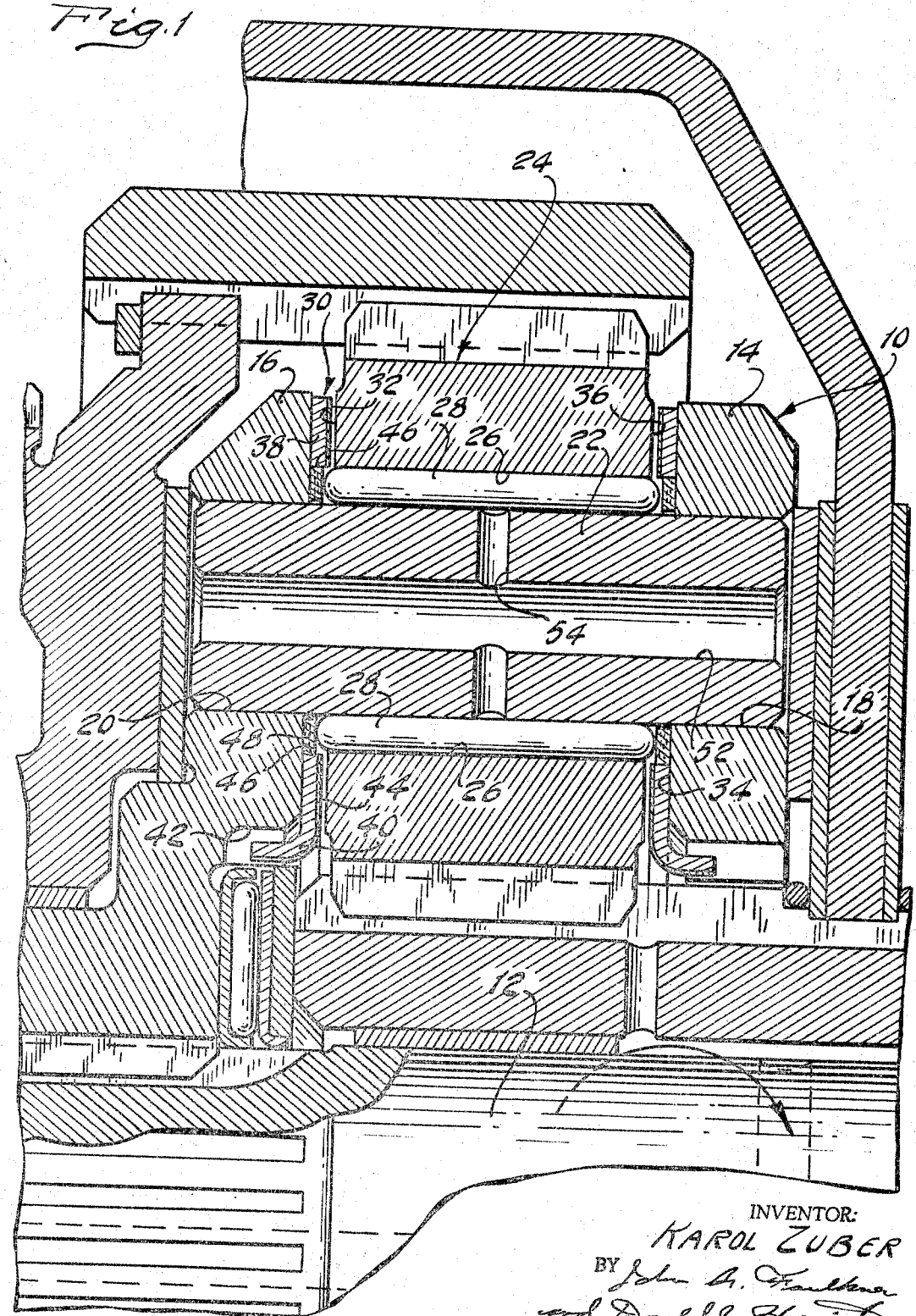
FIGURE 1 shows in longitudinal cross-sectional form a planetary gear unit with a carrier pinion employing my improved bearing arrangement.

Referring first to FIGURE 1, numeral 10 designates generally a portion of a planetary carrier in a planetary gear system. It is adapted to rotate about an axis indicated in FIGURE 1 at 12. The carrier 10 includes a pair of side plates 14 and 16 between which the pinions for the carrier assembly are situated. The plates 14 and 16 are joined together to form a common assembly.

Plate 14 is formed with an opening 18, and plate 16 is formed with a corresponding opening 20. Openings 18 and 20, which are aligned, receive therethrough a pinion shaft 22 with the plates 14 and 16 providing end support. Shaft 22 may be retained by means of a force fit or by other suitable retainer means. By preference, three shafts 22 are provided at angularly spaced intervals of 120°. Each shaft 22 is adapted to support a pinion.

In FIGURE 1 the pinion associated with shaft 22 is identified by reference character 24. Pinion 24 has a width that is less than the spacing between the juxtaposed surfaces of the plates 14 and 16. It is formed with a central bore 26 which receives the shaft 22. A plurality of needle bearing rollers 28 are situated between the surface of the bore 26 and the surface of the shaft 22. The rollers 28, which occupy the annular space that is defined by these two surfaces, are situated in close proximity about the periphery of the shaft 22 in the usual fashion.

A thrust washer 30 is located between the plate 16 and an annular bearing surface 32 formed on one side of the pinion 24. A corresponding bearing 34 is situated between the plate 14 and a bearing surface 36 formed on the pinion 24. Thrust washers 30 and 34 are identical, although one is a mirror image of the other. For this reason, only thrust washer 30 will be described further with reference to FIGURES 2 and 3.

Thrust washer 30 includes an annular steel ring 38 which has formed thereon a tab 40. This tab is received within an opening 42 formed in the plate 16. The thrust washer 30 is prevented from rotating about the axis of the shaft 22 in this fashion.

Bonded to the right-hand surface of the ring 38 is a lining 44 which is made of suitable bearing alloy material. It may have a thickness of approximately .005 inch. In contrast, the thickness of the steel ring 38 may be approximately .044 inch.

The steel ring 38 is formed with a central opening 46 which receives a steel thrust ring 48. By preference, this ring is held in place in the opening 46 by a force fit or by staking. The axial thickness of the ring 48 is slightly less than the combined axial thickness of the ring 38 and the lining 44.

When the thrust washer 30 is assembled as shown in FIGURE 1, the left ends of the needle bearing rollers 28 engage the thrust ring 48 and are held from shifting in an axial direction. The lining 44 on the ring 38 engages the surface 32 on the pinion 24 and provides a thrust bearing action. It will be apparent from FIGURE 1 that the length of the rollers 28 is greater than the thickness of the pinion 24. Thus, the full axial extent of the bore can be used to provide a bearing support.

I thus have provided a combined thrust washer and needle roller retainer assembly which is characterized by an elimination of centrifugal forces on the pinion shaft and the pinion bore. Such forces are characteristic of retainers and roller assemblies of known design. The absence of retainers within the bore itself eliminates the possibility of scoring the bore of the pinion.

My design is characterized also by its ability to accommodate lubrication fluid. The fluid may be admitted to the region of the rollers 28 through lubrication passages 52 and 54, the latter extending radially into the annular space between the bore 26 and the shaft 22. Oil can flow freely in an axial direction between the rollers, and hence, outwardly in a radial direction past the thrust washers 30 and 34. A free lubrication flow path thus is provided. In contrast with conventional arrangements, the retainers for the needle rollers in conventional designs restrict the lubrication flow path since they are of necessity located within the bore. Such retainers in conventional arrangements are piloted either on the bore itself or on the shaft.

Having thus described a preferred form of my invention, what I claim and desire to secure by U.S. Letters Patent is:

1. A needle bearing assembly journaling a gear element on a mounting shaft comprising a bore formed in said element, said shaft being received through said bore, a plurality of needle rollers in said bore surrounding said shaft and extending in the direction of the axis of said shaft, annular thrust bearing surfaces formed on opposed sides of said element, the axial length of said rollers being at least as great as the distance between said thrust bearing surfaces, a pair of thrust washers surrounding said shaft, one washer being situated on each side of said element in engaged relationship with respect to said thrust bearing surfaces, said one thrust washer having a central opening with a diameter greater than the diameter of said shaft, and a hardened thrust ring disposed in said one thrust washer opening, said thrust ring surrounding said shaft and having an axial width that is less than the axial width of said one thrust washer.

2. In a bearing assembly journaling a planetary pinion on a planetary carrier, the latter being adapted to rotate about a first axis, a pinion shaft supported by said carrier, a bore formed in said pinion, said shaft being received through said bore and cooperating therewith to define an annular space, a plurality of needle rollers situated in said space and arranged in parallel disposition with respect to the axis of rotation of said pinion, a thrust washer situated on each side of said pinion, annular bearing surfaces formed on opposed sides of said pinion and engageable with said thrust washers, central openings formed in said thrust washers with a diameter greater than the diameter of said shaft, said thrust washers being received over said shaft, and a hardened thrust ring in each of the openings in said thrust washers in axial alignment with said needle rollers, the axial width of each thrust ring being less than the axial width of its associated thrust washer, said needle rollers having a length at least as great as the distance between the bearing surfaces formed on said pinion.

3. A needle bearing assembly journaling a gear element on a mounting shaft comprising a bore formed in said element, said shaft being received through said bore, a plurality of needle rollers in said bore surrounding said shaft and extending in the direction of the axis of said shaft, annular thrust bearing surfaces formed on opposed sides of said element, the axial length of said rollers being at least as great as the distance between said thrust bearing surfaces, a pair of thrust washers surrounding said shaft, one washer being situated on each side of said element in engaged relationship with respect to said thrust bearing surfaces, said thrust washer having a central opening with a diameter greater than the diameter of said shaft, a hardened thrust ring disposed in each thrust washer opening, each of said thrust rings surrounding said shaft and having axial width that is less than the axial width of its associated thrust washer, and lubrication oil passage means including a radial passage formed in said shaft and communicating with said bore, said radial passage defining a part in a lubrication oil flow path along said rollers, said path extending radially outwardly past said thrust washers.

4. In a bearing assembly journaling a planetary pinion on a planetary carrier, the latter being adapted to rotate about a first axis, a pinion shaft supported by said carrier, a bore formed in said pinion, said shaft being received through said bore and cooperating therewith to define an annular space, a plurality of needle rollers situated in said space and arranged in parallel disposition with respect to the axis of rotation of said pinion, a thrust washer situated on each side of said pinion, annular bearing surfaces formed on opposed sides of said pinion and engageable with said thrust washers, central openings formed in said thrust washers with a diameter greater than the diameter of said shaft, said thrust washers being received over said shaft, and a hardened thrust ring in each of the openings in said thrust washers in axial alignment with said needle rollers, the axial width of each thrust ring being less than the axial width of its associated thrust washer, said needle rollers having a length at least as great as the distance between the thrust surfaces formed on said pinion, and lubrication oil passage means including a radial passage formed in said shaft and communicating with said bore, said radial passage defining a part in a lubrication oil flow path along said rollers, said path extending radially outwardly past said thrust washers.

References Cited by the Examiner

UNITED STATES PATENTS 253,859    2/1882    Ford _____ 308—208

MARTIN P. SCHWADRON, *Primary Examiner.*

FRANK SUSKO, *Assistant Examiner.*